United States Patent [19]

Fessler et al.

[11] 3,741,591

[45] June 26, 1973

[54] BALL JOINT ASSEMBLY

[75] Inventors: Leroy E. Fessler, Roselle; Wayne M. Davis, Highland Park, both of Ill.

[73] Assignee: Universal Oil Products Company, Des Plaines, Ill.

[22] Filed: Dec. 29, 1971

[21] Appl. No.: 213,692

[52] U.S. Cl. ................ 285/270, 285/321, 285/342
[51] Int. Cl. ............................................ F16l 27/06
[58] Field of Search .................. 285/261, 263, 270, 285/271, 321, 342; 287/90 R, 90 C, 87

[56] References Cited
UNITED STATES PATENTS

| | | | |
|---|---|---|---|
| 3,602,532 | 8/1971 | Ehrenberg | 285/364 |
| 1,197,588 | 9/1916 | Austin | 285/270 |
| 3,236,544 | 2/1966 | Brown | 285/261 X |
| 1,346,524 | 7/1920 | Bard | 285/271 |
| 2,877,732 | 3/1959 | Eaton | 285/321 X |
| 908,414 | 12/1908 | Mellin | 285/270 X |
| 900,603 | 10/1908 | Silk | 285/270 |

*Primary Examiner*—Thomas F. Callaghan
*Attorney*—James R. Hoatson, Jr.

[57] ABSTRACT

Compact ball joint assembly for piping system has ball and socket portions which may be formed of pipe. A reaction member held internally of the socket portion by retaining means such as a retaining ring or radially extending socket screws provides a support for a plurality of adjustment screws which can be moved in a direction parallel to the axis of the socket portion for forcing a pressure ring positioned for axial movement within the socket against a sealing ring which bears against the ball portion of the joint.

12 Claims, 5 Drawing Figures

PATENTED JUN 26 1973

3,741,591

BALL JOINT ASSEMBLY

BACKGROUND OF THE INVENTION

This invention relates to ball joints and particularly to ball joints of the type used in piping systems. Although the invention is useful for pipes as small as one inch, it is especially useful for larger size pipes, such as those of a diameter of 4 inches or more.

In large buildings, and other facilities such as chemical processing plants, large numbers of pipes are used to carry water, steam, air, chemicals and other fluids. For providing ease of access to these pipes and to take up as little usable space as possible, such pipes are commonly grouped together and mounted on ceilings or in walls or carried in tunnels or through other passageways. Obviously, the more space consumed by the pipes, the higher the ceilings must be, the thicker the walls, and the larger the tunnels. Increasing the dimensions of the passageway, particularly when it is an underground tunnel, is very expensive. Thus, it is desirable that the pipes require as little space as possible. One major factor which determines the space requirement is the major diameter of the ball joint members used to connect sections of pipe. The ball joints commonly used and those shown in the prior art, such as U.S. Pat. No. 908,414 and U.S. Pat. No. 1,197,588, have an outer diameter which is much greater than the diameter of the pipe with which they are used. For example, one commercially available ball joint for an 8 inch pipe has a 14-¾ inch outer diameter. The large diameter results from the fact that the socket member which receives the ball end portion of the ball joint assembly has outwardly extending flanges which are attached by a plurality of bolts to a pressure plate which, in turn, carries additional bolts to apply pressure to a sealing means. Although some ball joints, such as those disclosed in U.S. Pat. No. 908,414, utilize an externally threaded cap member or an internally threaded member as an alternative to using a flanged portion for providing sealing pressure, the use of threaded members is generally limited to the smaller sizes of pipe, such as under four inches. This is so since the provision of threads would greatly weaken the socket portion of the joint. For example, the FIG. 5 embodiment of U.S. Pat. No. 908,414 shows that the socket has its end flanged outwardly so that the wall thickness is increased to provide material for the threads.

SUMMARY

The ball joint of the present invention has a major diameter which is much less, as compared to the diameter of the pipe with which it is used, than the same dimension on prior art pipe joints. For example, a ball joint for an 8 inch pipe may have an outer diameter of 12-¾ inch as compared to the 14-¾ inch outer diameter of the aforementioned prior art ball joint. The 2 inch difference in outer diameters is very significant, especially when one considers that the smallest square opening into which the prior art joint may be placed has an area 33 percent larger than is necessary for the joint of the invention. The improved pipe joint is also: more economical to manufacture; simpler to manufacture; more efficiently sealed; and capable of a greater freedom of movement than presently available pipe joints.

The improved ball joint of the present invention eliminates the flanges used in prior art ball joints. A retaining means is attached to the interior of the open end of the socket body portion of the joint and is held in a predetermined axial position by means such as a snap ring mounted in the inner wall of the socket or by radially extending socket screws or other fasteners which extend radially through the socket body. Since the socket body may be fabricated of wrought metal such as a length of pipe or from rolled and welded plate, the expense and the inherent problems often found with forgings or castings can be eliminated. The ball joint is sealed by an outer sealing ring which is forced into firm contact with the ball portion of the joint by a pressure ring which is shaped to exert a force normal to the ball at the same time that the pressure ring is moved longitudinally by means of axially extending screws which are carried by the retaining ring.

DESCRIPTION OF THE PREFERRED EMBODIMENTS

Figure 1:
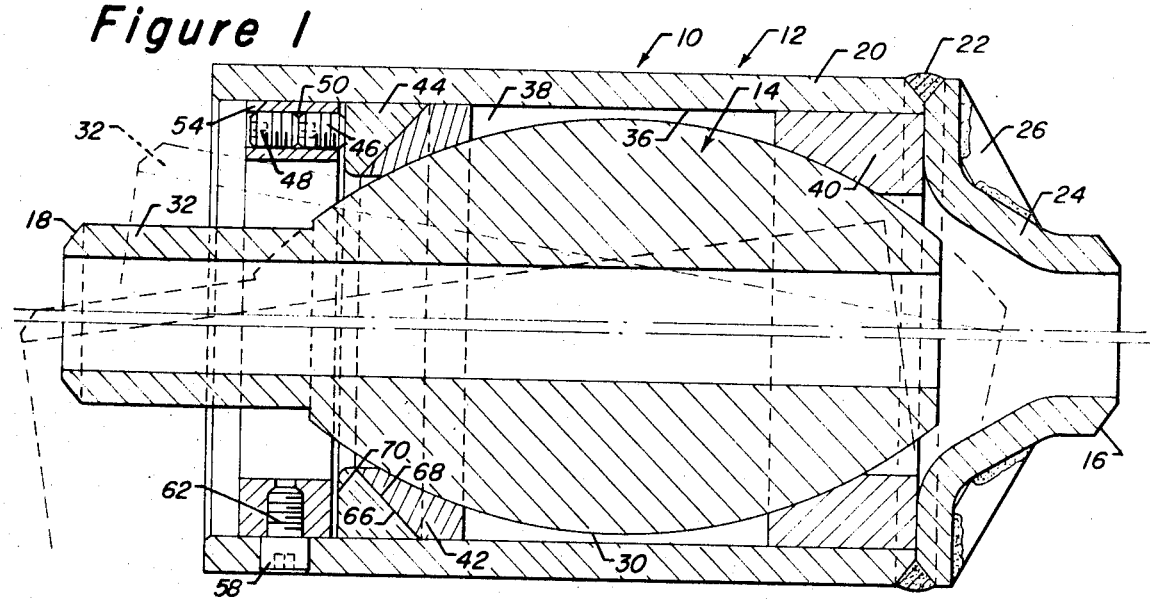
FIG. 1 is a longitudinal sectional view of the improved pipe joint assembly with its diameter foreshortened.

Referring to FIG. 1, a ball joint assembly indicated generally at 10 includes a socket member indicated generally at 12 and a ball member indicated generally at 14. The socket member 12 terminates at its inner or closed end in a chamfered annular surface 16 which is adapted to be welded to a length of pipe (not shown). Similarly, the outer end 18 of ball member 14 is chamfered and of an annular shape adapted to be welded to a length of pipe (not shown). Although the socket member 12 could be formed by casting or forging it is preferably and far more economical to form it from either a cylindrical section of pipe as shown at 20 or from plate material which has been rolled into a cylindrical shape and welded. After the outer wall of the socket member 12 is formed from a cylindrical pipe section 20, the socket member is completed by using a weld joint 22 to attach the pipe section 20 to a reducer member 24 which may be formed by a stamping operation. If desired, the reducer member 24 may be strengthened by means of welded gusset plates 26.

The ball member 14 may be turned from a thick walled tubular member so as to form a spherically surfaced ball portion 30 and a narrow walled tubular portion 32. The ball member could also be formed in other ways, such as by casting or forging or in the case of small sizes of pipe, by expanding a portion of the pipe to form the spherically surfaced ball portion.

The socket member 12 includes an internal socket wall 36 which defines an interior chamber 38. Positioned at the inner end of the chamber 38 is an inner seal member 40. An outer seal member 42 is also positioned in the chamber 38 at a location spaced axially outwardly from the inner seal 40. The inner and outer seals 40, 42 may be made of any suitable material, such as an elastomeric material, plastics, carbon, or ceramics and are spaced from each other on opposite sides of a transverse plane which is normal to the axis of ball member 14 and passes through the center of its spherically surfaced ball portion 30. The inner and outer seals 40, 42 provide the only regions of contact between the ball member 14 and the socket member 12. In order to provide a positive sealing between the ball and socket members 12, 14 upon initial assembly or after wear of the seals has taken place a pressure ring 44 is provided which may be moved axially into engagement with outer seal 42 by means of a plurality of adjusting screws 46 spaced around the periphery of ring 44. Once the adjusting screws 46 are tightened so as to exert the desired amount of pressure on pressure ring 44 a plurality of lock screws 48 are screwed into place in threaded holes 50 to prevent the adjusting screws 46 from moving out of their adjusted position. In order to allow the various portions of the joint assembly to be assembled and to provide a reaction member to absorb the thrust of the adjusting screws 46, a thrust ring 54 is provided which is held in place against the internal socket wall 36 and in a predetermined axial position by means of fastener means such as socket screws 58 which pass through radial holes in the pipe section 20 and are threaded into holes 62 in the thrust ring 54. The screws 58 are positioned uniformly around the periphery of the socket member 12 in order to firmly hold the thrust plate 54 in position.

In order to apply relatively uniform pressure along the entire length of outer seal 42 the seal is preferably provided with an angled surface 66 which is engaged by a correspondingly angled surface 68 on the pressure ring 44. The angled surfaces cooperate so that an axial load applied by adjusting screws 46 to the transverse end surface 70 of the pressure ring 44 causes a movement of the seal 42 into engagement with the ball portion 30 in a generally radial direction. Such a loading of the seal helps to relieve stress concentrations in the seal and also helps to prevent the seal from being extruded outwardly from between the ball surface 30 and the pressure ring 44.

Figure 2:
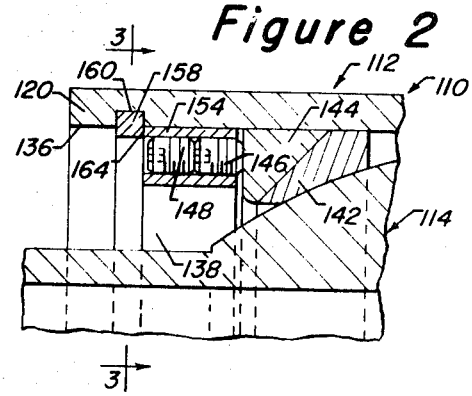
FIG. 2 is a longitudinal section similar to FIG. 1 but showing a modified form of pressure ring retaining means.

FIG. 2 illustrates an embodiment of the invention which is generally identical to the embodiment of FIG. 1 except that a thrust ring 154 is held in position within the chamber 138 by a fastener means in the form of a snap or retaining ring 158 rather than by radial screws such as the screws 58 shown in FIG. 1. The elements 110, 112, 114, 120, 136, 138, 142, 144, 146, 148, and 154 all correspond to the similarly numbered elements 10-54 in FIG. 1. The snap or retaining ring member 158 is retained in a fixed axial position relative to the wall 120 by a groove 160 formed in the wall. The retaining ring 158 can have a relatively small depth since the main load it encounters is an axial shear load along the wall 136 which is restrained by transverse surface 164.

Figure 3:
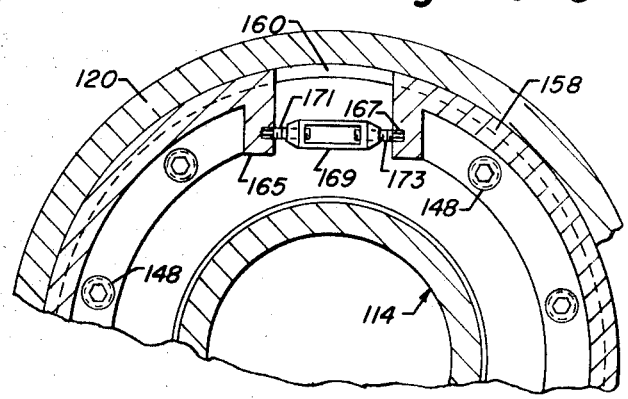
FIG. 3 is a end sectional view taken on line 3—3 of FIG. 2.

In view of the very large shear loads applied to the retaining ring 158 shown in FIG. 2 it is highly desirable that the retaining ring be held as tightly as possible against the outer walls of the groove 160 so as to eliminate any tendency it might have to twist and become removed from the groove. Preferably, the retaining ring member 158 is formed with a pair of radially inwardly extending ears 165 (FIG. 3) which may be pulled toward each other to mount the ring in the groove 160. The ring 158 may also be spread apart after the ring has been placed in the groove by means of an adjustable spreading member such as the turnbuckel member 169 which carries threaded shafts of opposite hand 171, 173 at its opposite ends. The outer ends of the shafts 171, 173 are formed with a shape which is complementary to the shape of recessed portions 167 formed in the ears 165 so that shafts 171, 173 will not rotate relative to the ears 165. To tighten the retaining ring 158 within the groove 160 the central portion of the turnbuckle member 169 is merely rotated to move the screws 171, 173 until the ears are pressed apart. When it is desired to remove the ring 158 from the groove 160 the turnbuckle member 169 may be loosened and removed and the ears 165, pulled toward each other in order to decrease the diameter of the ring 158 and permit its removal.

Figure 4:
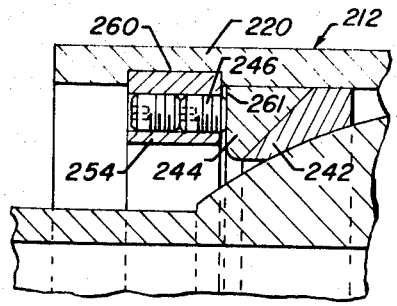
FIG. 4 is a partial longitudinal sectional view similar to FIG. 1 and FIG. 2 but showing a modified form of pressure ring retaining means; and, FIG. 5 is a longitudinal sectional view similar to FIG. 1 showing a prior art ball joint assembly.

FIG. 4 illustrates an additional embodiment of the invention which, like the embodiment of FIG. 2, differs from the embodiment of FIG. 1 only in the manner in which the thrust ring 254 is fixed relative to the wall 220 of the socket member 212. Rather than have the thrust ring 254 attached to the socket wall 120 by means of screws (FIG. 1) or by a separate retaining ring (FIG. 2), the thrust ring 254 is itself formed as a retaining ring which is similar to the retaining ring 158 shown in FIGS. 2 and 3 in that it performs the function of holding itself in place within a groove 260 formed in wall 220. Although not shown, the thrust ring 254 is preferably provided with an adjustment device, such as the turnbuckle 169 shown in FIG. 3, in order to maintain it in tight engagement with the groove 260. The adjustment screws 246 in this embodiment function in identical fashion to the screws 146 in the embodiment of FIG. 2 and engage the transverse surface 261 of pressure ring 244.

Figure 5:
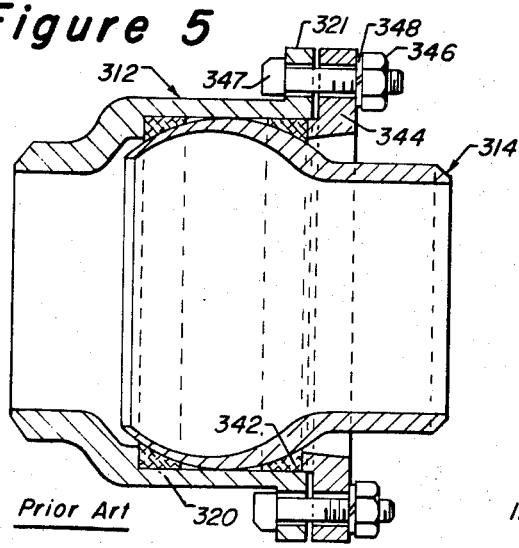

As previously mentioned, the present invention, as exemplified by the embodiments of FIGS. 1–4, results in a ball joint which, at least for pipe sizes of 4 inch or more, has a maximum outer diameter which is much less than those found on prior art ball joints. Referring to the prior art ball joint shown in FIG. 5, which includes a socket member 312, a ball member 314, a socket wall 320 and a sealing ring 342, it is apparent that the prior art joint is in many respects similar to the instant embodiments. However, the prior art joint includes a rigid outwardly projecting flange member 321 which extends from the wall 320. This outer flange 321 carries a plurality of bolts 347 which extend axially through a pressure ring 344 which may be drawn into engagement with sealing ring 342 by progressively tightening nut members 346 which are spaced from the pressure ring 344 by lock washers 348. Since the bolts 347 must be of substantial diameter and the flange 321 must extend a sufficient distance beyond the bolts to permit them to be firmly fastened, it is obvious that the prior art embodiment of FIG. 5 must have a substantially greater outer diameter than the ball joint assembly of the invention. Thus, it would take up substantially more space than the assembly of the invention for a given pipe size.

In addition to being compact as well as economical to manufacture, the improved ball joint assembly also offers a greater movement range than known prior art devices. For example, in an 8 inch pipe size, the assembly provides about an 18° movement range as compared to a 15° range in certain prior art assemblies. The larger movement range is possible partly because of the elimination of bolts and partly because of the diameter chosen for the spherical ball portion. The movement range of the ball member 14 is indicated in dotted lines in FIG. 1.

We claim as our invention:

1. A ball joint assembly comprising a socket member defining an interior chamber and a hollow ball member having a ball shaped outer surface portion and a tubular portion, said ball member being adapted to be recieved in said interior chamber through a first end thereof with said tubular portion extending outwardly therefrom, first sealing means mounted in said chamber for resisting axial movement of said ball member into said socket and second sealing means in said chamber adapted to be compressed against said ball member in a direction to force it against said first sealing means, said first and second sealing means being positioned in said interior chamber between the interior surface of said socket member and the ball shaped outer surface of said ball member; pressure ring means in said chamber and in contact with said second sealing means; thrust ring means spaced radially from said ball member and located within said interior chamber in surrounding relationship to said tubular portion and at a predetermined distance relative to said first end of said interior chamber; said thrust ring means having a greater cross-sectional dimension in the axial direction than in the radial direction and having an outer diameter equal to the inner diameter of said socket member for preventing rotation of said thrust ring means relative to said socket member, fastening means for holding said thrust ring means at at least a plurality of points around its periphery and preventing it from moving closer than said predetermined distance relative to said first end of said interior chamber after it has been located at said predetermined distance; and adjusting means mounted in said thrust ring means and movable into engagement with said pressure ring means for forcing said pressure ring means against said second sealing means, said thrust ring means and said fastening means being removable from said socket member with said adjusting means in their mounted position in said thrust ring means.

2. The ball joint assembly of claim 1 characterized in that said socket member includes an outer wall which defines the major diameter of said ball joint assembly, said outer wall comprising the outer surface of a length of cylindrical pipe.

3. The ball joint assembly of claim 1 characterized in that inner and outer sealing rings are positioned between said interior surface of said socket member and the ball-shaped outer surface of said ball member at locations along the axis of said ball member which are on opposite sides of a plane normal to the axis of the ball member and passing through the center of curvature of the ball-shaped outer surface.

4. The ball joint assembly of claim 1 wherein said second sealing means comprises a sealing ring member and said pressure ring means comprises an annular member having an outer, transverse bearing surface in contact with a plurality of said adjusting means mounted in the thrust ring means, the inner, transverse surface of said annular member having at least one angled portion in contact with said at least one sealing means, said angled portion being at such an angle as to force said second sealing means in a generally normal direction into engagement with said ball-shaped surface when said adjusting means are moved toward said annular member.

5. The ball joint assembly of claim 4 wherein said sealing ring member is formed of elastomeric material.

6. A ball joint assembly in accordance with claim 1 wherein said fastening means is a retaining ring which is carried in a groove in the inner wall of said socket member.

7. A ball joint assembly in accordance with claim 6 wherein said retaining ring is discontinuous at one portion of its curcumference, the portions of said retaining ring adjacent said discontinuous portion extending radially inwardly so as to form ears which are adapted to be engaged by external means for squeezing them together to reduce the maximum diameter of the retaining ring and permit the retaining ring to be assembled into said groove.

8. A ball joint assembly in accordance with claim 7 and further including means to force said ears away from each other so as to increase the outer diameter of said retaining ring and permit it to more firmly engage the outer wall of the groove in said inner wall of the socket member.

9. A ball joint assembly in accordance with claim 8 wherein said means to hold said ears apart comprises a turnbuckle member.

10. A ball join assembly in accordance with claim 1 wherein said fastening means comprise radially positioned screws which pass through the outer wall of said socket member and into said thrust ring means at positions intermediate said adjusting means.

11. A ball joint assembly in accordance with claim 1 wherein said ball member is mounted within said socket member for pivotal movement of at least 15°.

12. A ball joint assembly in accordance with claim 1 wherein said ball member is mounted for pivotal movement within said socket member over a movement range of at least 18°.

* * * * *